UNITED STATES PATENT OFFICE.

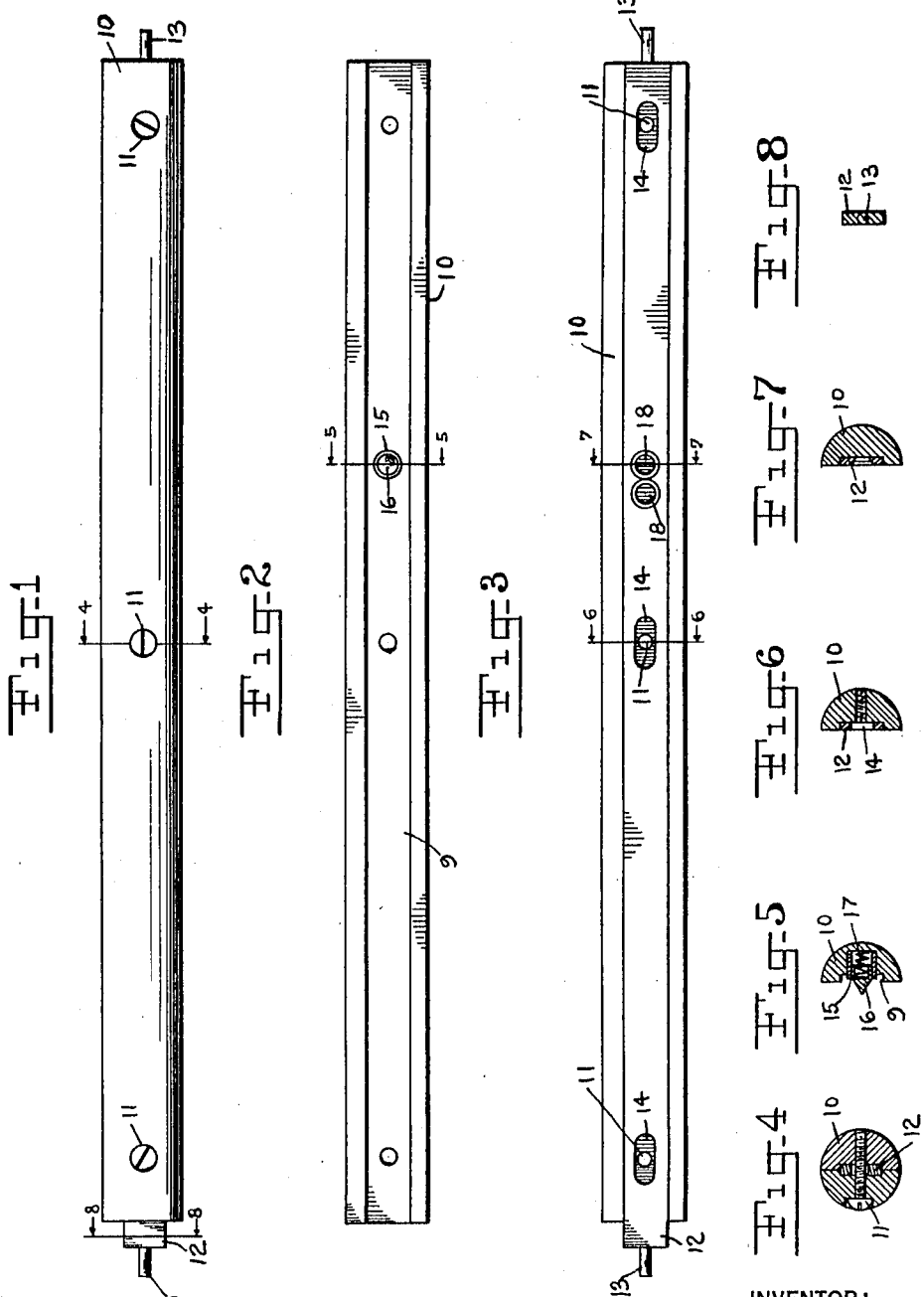

ADOLF KLEIN, OF NEW YORK, N. Y., ASSIGNOR TO THE BECK DUPLICATOR COMPANY, A CORPORATION OF NEW YORK.

SPINDLE.

1,314,141. Specification of Letters Patent. Patented Aug. 26, 1919.

Application filed March 21, 1919. Serial No. 284,004.

*To all whom it may concern:*

Be it known that I, ADOLF KLEIN, a citizen of the United States, and a resident of the borough of Manhattan, city, county, and State of New York, have invented certain new and useful Improvements in Spindles, of which the following is a specification.

The invention relates to spindles or rollers such as are adapted to bear, rolled or stored thereon, material which it is desired to store in rolled form until needed for use and then to be unrolled from the spindle and if desired rerolled thereupon.

One of the principal objects of the invention is to provide such a roller which may be easily and conveniently employed in connection with apparatus in which the material stored upon the roller is used, and which may be easily and quickly removed and replaced in a reversed position for rewinding the material thereon, as hereinafter particularly explained.

The invention consists in the novel construction, arrangement and combination of elements and parts, as shown in the accompanying drawings and hereinafter more particularly described.

In the said drawings Figure 1 is a side view of a preferred form of my improved spindle; Fig. 2 is an interior view of one of the sections of which the spindle is composed; Fig. 3 is a similar view showing said section with the supporting shaft in position; Fig. 4 is a transverse section on the line 4—4 of Fig. 1; Fig. 5 is a transverse section on the line 5—5 of Fig. 2; Fig. 6 is a transverse section on the line 6—6 of Fig. 3; Fig. 7 is a transverse section on the line 7—7 of Fig. 3; and Fig. 8 is a transverse section on the line 8—8 of Fig. 1.

In carrying my invention into effect in the embodiment thereof which I have selected for illustration in the accompanying drawings and for description in this specification, I provide a tube 10, of wood or other suitable material, comprising two sections, which are adapted to be secured together, when the device is assembled, by the screws 11.

The said sections are grooved or channeled, so that when the tube is assembled a longitudinal opening or bore 9 extends therethrough. A rod 12 is provided, adapted to slide through the said bore in the said tube, the main portion of which rod is somewhat longer than the tube 10, and which rod is provided at each end with a longitudinally projecting pin or stud 13, forming a bearing for the spindle as hereinafter described.

The main portion of the said rod or shaft 12 is angular in cross section, whereby either end of the same, when it projects out of the tube 10, is adapted to act as a chuck-engaging member; the stud or pin 13, on the contrary, is preferably cylindrical, so as to be adapted to serve as a bearing pin.

The shaft 12 is provided with slots 14, adapted to permit the passage therethrough of the screws 11, so that the rod 12 is capable of limited longitudinal movement with relation to the tube 10, so that either end of the rod may project out beyond the end of the tube as shown in Figs. 1 and 3.

Located at any suitable point in one of the sections of the tube 10, is a socket in which is inserted a locking device, shown more particularly in detail in Fig. 5. This locking device comprises a sleeve 15, in which is slidably mounted a conical pin 16, which is normally forced outward by a helical spring 17. At a corresponding location in the shaft 12 are provided two openings 18 (see particularly Fig. 3), one or the other of which is adapted to engage with said conical pin 16, according to whether one end or the other of said shaft is projecting out beyond the end of the tube 10.

The operation of my invention is as follows: It will be understood that devices embodying the invention are intended for use in pairs, each of which will usually contain a portion of the material stored thereon, which material is to be wound from one spindle to the other and if desired rewound from the second back to the first. The spindles are intended to be used in connection with machines or apparatus of appropriate character, which comprise on one side a chuck adapted to engage with one end of a spindle placed in said machine, and thereby rotate the said spindle, and on the other side a bearing adapted to support the other end of said spindle and permit the same to freely rotate. My improved spindle therefore is placed in such a machine, with one end of the shaft 12 projecting from the tube 10 said projecting end being inserted into the chuck, the stud on the other end of said shaft being inserted in the bearing in the said machine. The shaft 12 is firmly held in the said position with relation to the tube 10, by the engagement of the locking device shown in Fig. 5 with one or the other of the sockets 18 in said shaft, and the spindle is then in a position which adapts it to be rotated by the chuck so to wind up thereupon material which it is desired to store thereon. The other spindle, from which the material is being unwound, is then free to rotate in a backward direction so as to permit the material to be unwound therefrom. When it is desired to rewind the material from the second spindle back onto the first spindle, both of the spindles are removed from the machine and are reversed end for end, the second spindle then occupying the position formerly occupied by the first spindle, and the shafts in both of said tubes being shifted longitudinally so that the ends of said shafts shall project from the other ends of said tubes, and the said spindles are then inserted into the machine, the projecting ends of the shafts serving as chuck-engaging members as before.

The advantages of my invention will be obvious from what has been above said with regard to its construction and method of operation.

Having thus described my invention what I claim as new and desire to secure by Letters Patent is as follows:

1. In a spindle, the combination with a tube; of a shaft adapted to extend longitudinally through said tube and slidable therein, the ends of said shaft being angular in cross section whereby they are adapted to form chuck-engaging members and each of said ends being provided with a longitudinally projecting stud adapted to form a bearing pin, whereby said spindle is adapted to be interchangeably reversed end for end.

2. In a spindle, the combination with a tube, comprising a plurality of sections one of which is provided with an interior channel; of a shaft extending longitudinally in said channel and slidable therein, the ends of said shaft being angular in cross section whereby they are adapted to form chuck-engaging members and each of said ends being provided with a longitudinally projecting stud adapted to form a bearing pin.

3. In a spindle, the combination with a tube; of a shaft longer than said tube and extending longitudinally therethrough and slidable therein, whereby one end of said shaft may always project from said tube, the ends of said shaft being angular in cross section whereby they are adapted to form chuck-engaging members and each of said ends being provided with a longitudinally projecting stud adapted to form a bearing pin.

4. In a spindle, the combination with a tube; of a shaft extending longitudinally through said tube and slidable therein; and devices adapted to control the movement of said shaft longitudinally in said tube: the ends of said shaft being angular in cross section whereby they are adapted to form chuck-engaging members and each of said ends being provided with a longitudinally projecting stud adapted to form a bearing pin.

5. In a spindle, the combination with a tube; of a shaft extending longitudinally through said tube and slidable therein, the ends of said shaft being angular in cross section whereby they are adapted to form chuck-engaging members and each of said ends being provided with a longitudinally projecting stud adapted to form a bearing pin; and means adapted to control the longitudinal movement of said shaft in said tube and to cause the same to rest in such a position relative to said tube that either one or the other of the ends of said shaft may always project from said tube.

6. In a spindle, the combination with a tube; of a shaft longer than said tube and extending longitudinally therethrough and slidable therein, the ends of said shaft being angular in cross section whereby they are adapted to form chuck-engaging members and each end of said shaft being provided with a longitudinally extending stud adapted to form a bearing pin, said shaft being provided with a pair of sockets therein; and a stop located inside said tube and adapted to engage with one or the other of said sockets, whereby one end or the other of said shaft may always project from said tube.

7. In a spindle, the combination with a tube; of a shaft longer than said tube and extending longitudinally therethrough and slidable therein, the ends of said shaft being angular in cross section whereby they are adapted to form chuck-engaging members and each end of said shaft being provided with a longitudinally extending stud adapted to form a bearing pin, said shaft being provided with a pair of sockets therein; and a spring-controlled stop located inside said tube and adapted to engage with one or the other of said sockets, whereby one end or the other of said shaft may always project from said tube.

Signed at New York city, N. Y., this 17th day of March, 1919.

ADOLF KLEIN.

Copies of this patent may be obtained for five cents each, by addressing the "Commissioner of Patents, Washington, D. C."